US012100918B2

(12) United States Patent
Ge

(10) Patent No.: US 12,100,918 B2
(45) Date of Patent: Sep. 24, 2024

(54) ROTARY PLUG CONNECTOR

(71) Applicant: Weidmüller Interface GmbH & Co. KG, Detmold (DE)

(72) Inventor: Xuefeng Ge, Henrico, VA (US)

(73) Assignee: Weidmüller Interface GmbH & Co. KG (DE)

( * ) Notice: Subject to any disclaimer, the term of this patent is extended or adjusted under 35 U.S.C. 154(b) by 573 days.

(21) Appl. No.: 17/445,753

(22) Filed: Aug. 24, 2021

(65) Prior Publication Data

US 2023/0040853 A1 Feb. 9, 2023

Related U.S. Application Data

(63) Continuation-in-part of application No. 17/392,787, filed on Aug. 3, 2021, now abandoned.

(51) Int. Cl.

| | |
|---|---|
| ***H01R 13/71*** | (2006.01) |
| ***H01R 13/11*** | (2006.01) |
| ***H01R 13/502*** | (2006.01) |
| ***H01R 24/00*** | (2011.01) |
| ***H01R 24/76*** | (2011.01) |

(52) U.S. Cl.

CPC ............. *H01R 13/71* (2013.01); *H01R 13/11* (2013.01); *H01R 13/502* (2013.01); *H01R 24/005* (2013.01); *H01R 24/76* (2013.01)

(58) Field of Classification Search

CPC ...... H01R 13/71; H01R 13/11; H01R 13/502; H01R 24/005; H01R 24/76; H01R 13/625; H01R 24/38; H01R 2101/00

See application file for complete search history.

(56) References Cited

U.S. PATENT DOCUMENTS

| | | | | |
|---|---|---|---|---|
| 9,966,702 | B2 * | 5/2018 | Swearingen | H01R 24/38 |
| 11,469,546 | B2 * | 10/2022 | Kralik | H01R 13/71 |
| 2020/0161815 | A1 * | 5/2020 | Houir Alami | H01R 13/625 |

FOREIGN PATENT DOCUMENTS

| | | |
|---|---|---|
| CN | 2445477 Y | 8/2001 |
| CN | 104426004 A | 3/2015 |
| CN | 104426004 B | 3/2015 |

* cited by examiner

*Primary Examiner* — Edwin A. Leon

(74) *Attorney, Agent, or Firm* — Laubscher & Fretwell

(57) ABSTRACT

A rotary plug electrical connector includes a plug and a socket, both of which include power contacts and signal contacts. The plug is rotatable within the socket between operable and inoperable positions. The power contacts of the socket include opposed surfaces which are engaged by resilient blade power contacts of the plug. The signal contact of the socket preferably includes a pair of contacts, and the signal contact of the plug preferably is a bridge contact that engages the socket signal contacts in the operable position and disengages the socket signal contacts in the inoperable position. When the signal contacts are disengaged, no power is transferred by the connector.

11 Claims, 9 Drawing Sheets

ROTARY PLUG CONNECTOR

This application is a continuation-in-part of application Ser. No. 17/392,787 filed Aug. 3, 2021.

BACKGROUND OF THE INVENTION

Plug connectors are used to connect an electrical power source such as a battery to one or more modules. Such connectors typically include a plug and socket having separate power and signal contacts, respectively, to connect both electrical power such as current and a signal such as data. Rotation of the plug relative to the socket operates the connector between on and off positions. That is, in a first position, the signal contacts between the plug and socket are disconnected. Rotating the plug to a second position bridges the signal contact of the socket with a contact of the plug to deliver signals. The signals may be used to control power in and power out from the power source to a module via the power contacts of the plug and socket.

The present invention relates to an improved plug connector in which the power contacts of the plug have a simpler construction and provide a reliable power connection.

BRIEF DESCRIPTION OF THE PRIOR ART

Rotary plug connectors for electrical assemblies are well-known in the prior art as evidenced by CN104426004 in which a plug is arranged in a socket and rotated between on and off positions. The socket contains a pair of spaced tulip power contacts and a central tulip signal contact while the plug contains a pair of pin or blade power contacts and a central pin signal contact. When the plug is rotated, the pin or blade power connectors slide relative to the tulip power contacts and the center signal contacts of the plug and socket are connected to deliver a signal and control the delivery of power from a power source to a module.

While the prior devices operate satisfactorily, they possess certain inherent drawbacks. That is, to maintain the power contacts between the plug and socket electrically connected during rotation of the plug relative to the socket, the socket tulip contacts must have an arcuate configuration. Such contacts are difficult to manufacture and require precision during assembly. Moreover, because of their flexible nature, the socket tulip contacts may be bent or damaged during repetitive rotation of the plug between its on and off position as the plug pin or blade contacts slide through the socket contacts. This diminishes the reliability of such plug connectors over time.

The present invention was developed in order to overcome these and other drawbacks of prior rotary plug connectors by providing a plug assembly in which the socket power contacts are configured as durable blades and the plug power contacts are configured as spring blade contacts which remain within and connected with the socket contacts during rotation of the plug relative to the socket.

SUMMARY OF THE INVENTION

Accordingly, it is a primary object of the invention to provide a rotary electrical connector assembly including a socket having a receptacle which contains a power contact assembly including a pair of spaced opposed contacts and a central signal contact assembly. The opposed contacts of the socket power contact assembly have either planar or concave contact surfaces. A plug is arranged within the socket receptacle. The plug is configured for rotary movement between operable and inoperable positions relative to the socket and includes a power contact assembly which includes a plurality of spaced blade contacts which are configured to engage the socket power contacts and a signal bridge which engages the socket signal contact assembly when the plug is in the operable position and which disengages from the socket signal contact assembly when the plug is in the inoperable position. When the signal contacts of the plug and socket are engaged, the connector assembly transmits power between the plug and signal contacts. When the signal contacts are disengaged, no power is transmitted.

In a preferred embodiment, the plug power contact assembly includes a central portion and opposed pairs of spaced parallel blade contacts which extend outwardly from the central portion, each pair of blade contacts at least partially engaging the opposed socket power contacts when the plug is rotated between the operable and inoperable positions. The plug power contacts have either an S-shaped or a U-shaped cross-sectional configuration.

The socket signal contact assembly preferably includes a pair of spaced parallel contacts. The plug signal bridge contact is configured to engage the free ends of the socket signal contacts when the plug is in the operable position.

BRIEF DESCRIPTION OF THE FIGURES

Other objects and advantages of the invention will become apparent from a study of the following description when viewed in the light of the accompanying drawing, in which.

DETAILED DESCRIPTION

Figure 1:
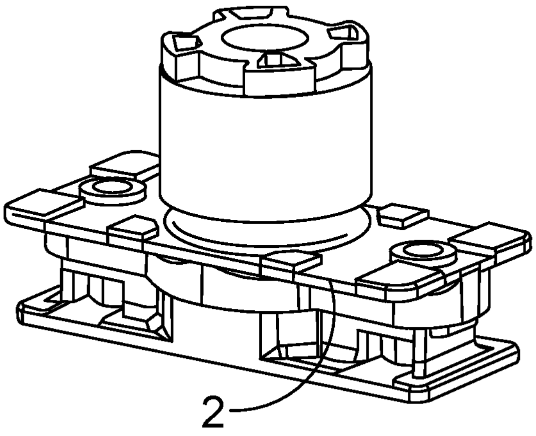
FIG. 1 is a front perspective view of the rotary plug electrical connector assembly according to the invention.
Figure 2:
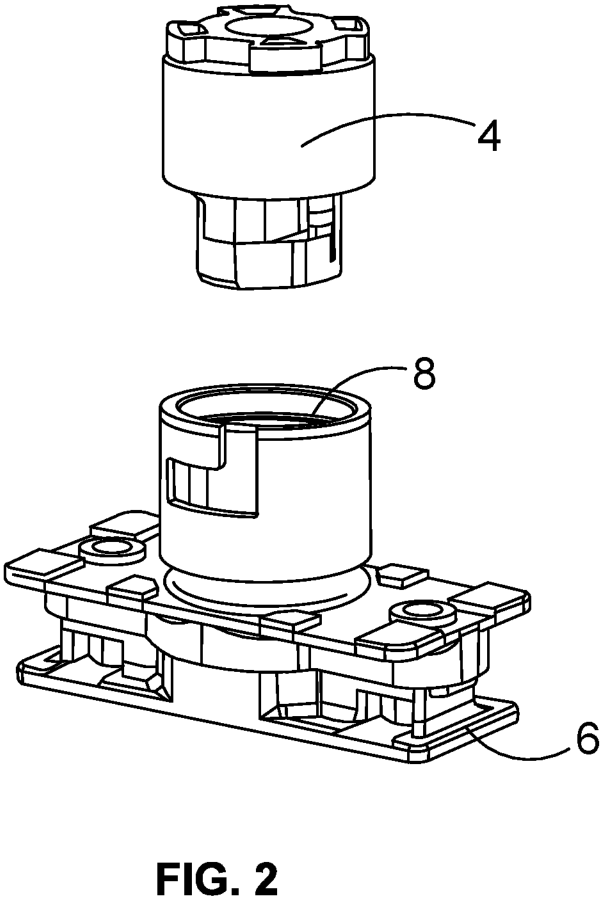
FIG. 2 is an exploded perspective view of the connector assembly.
Figure 5:
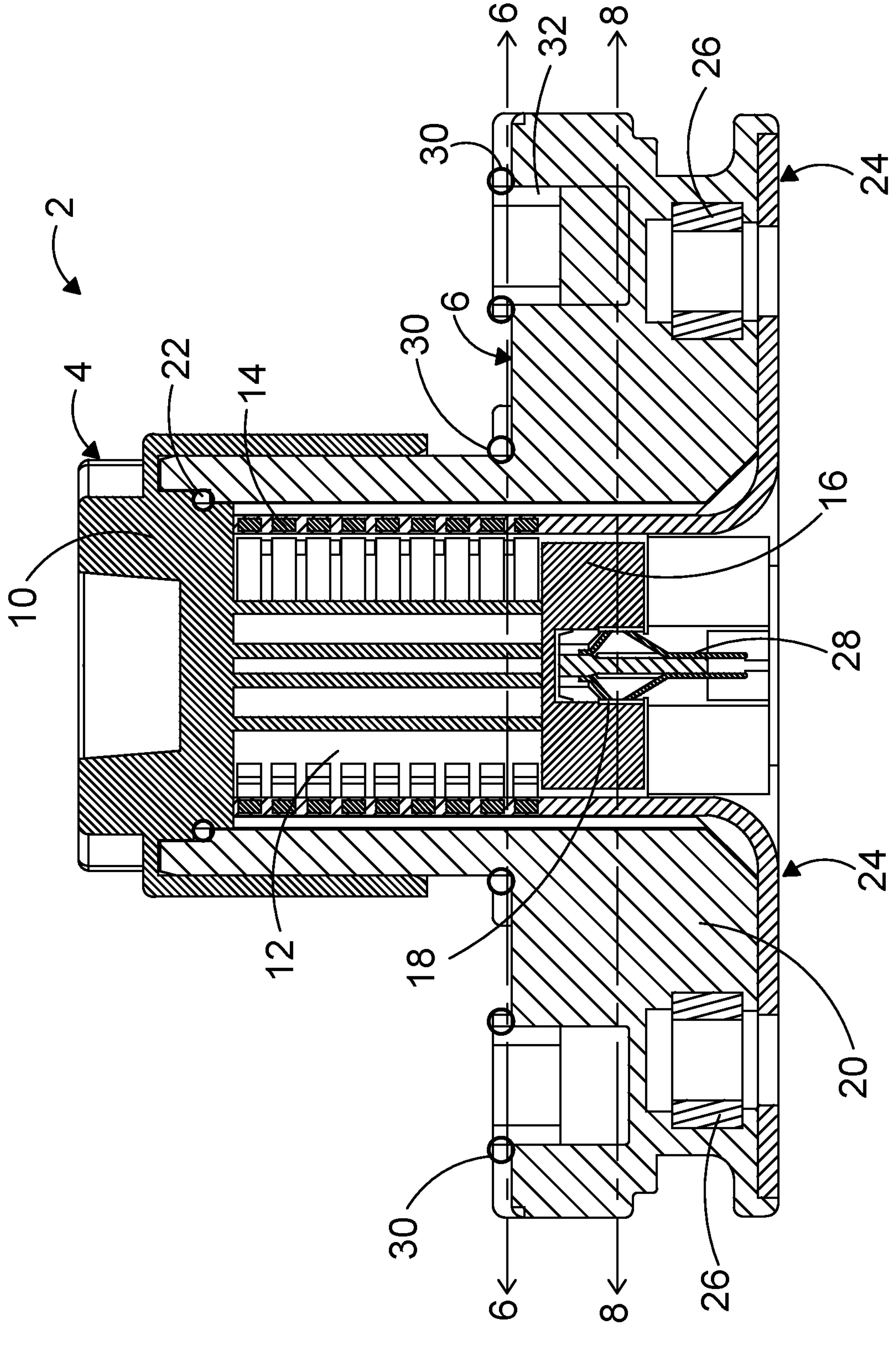
FIG. 5 is a front sectional view of the connector assembly.

Referring first to FIGS. 1 and 2, the electrical connector assembly 2 according to the invention includes a plug 4 and socket 6. The socket includes a receptacle 8 in which the plug is arranged as shown in FIG. 5. As will be developed in greater detail below, the plug is configured for rotation within the socket receptacle.

Figure 3:
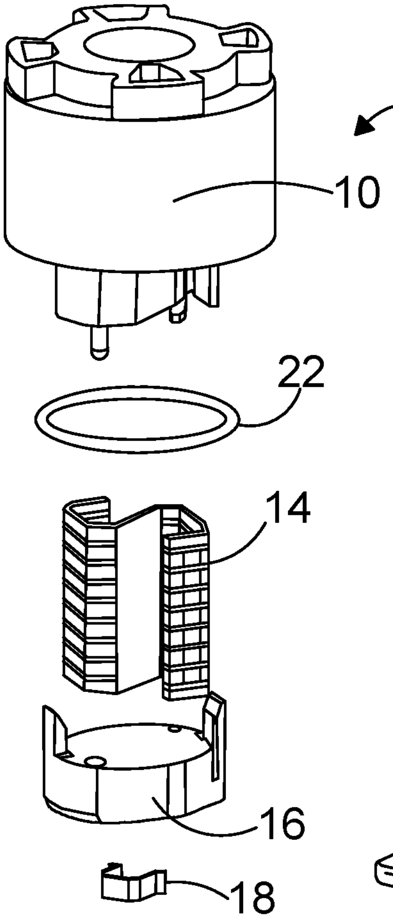
FIGS. 3 and 4 are exploded perspective view of the plug and socket, respectively, of the connector assembly.

As shown in FIG. 3, the plug includes a generally cylindrical housing 10 which is formed of a durable rigid material such as synthetic plastic. The plug includes an inner chamber 12 (shown in FIG. 5) within which is arranged a power contact assembly 14. A cover 16 is provided to close the bottom of the plug chamber. Arranged within the cover is a signal bridge contact 18.

Figure 4:
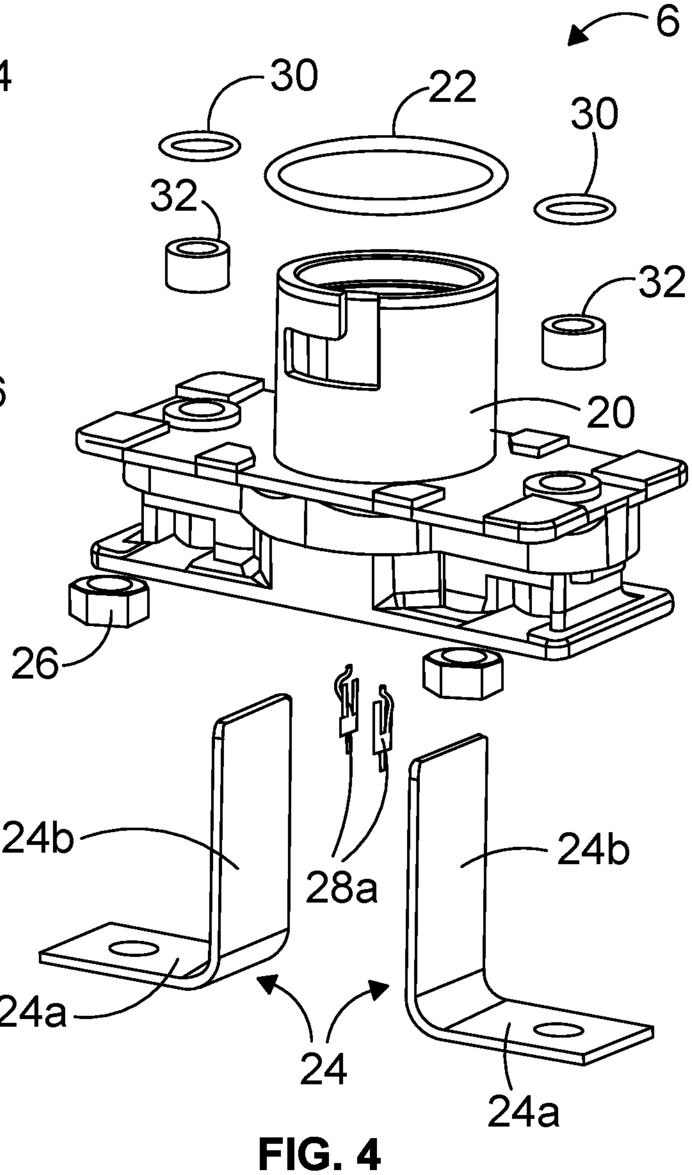

The socket 6 of the connector assembly is shown in FIG. 4. It includes a cylindrical housing 20 formed of non-conductive material such as synthetic plastic which contains the receptacle. The inner diameter of the receptacle corresponds with the outer diameter of the plug housing with a limited amount of play to allow the plug to rotate within the socket receptacle. An O-ring or other circular seal 22 is provided between the upper edge of the socket housing and the lower surface of the plug housing. A pair of power contacts 24 are connected with the socket housing by suitable fasteners such as a pair of bolts (not shown) which cooperate with nuts 26. The socket power contacts are formed of a durable and preferably rigid conductive material such as metal. They preferably have an L-shaped configuration with the lower portions **24*a* thereof being connected with the socket housing. The upper portions 24*b* of the socket power contacts extend upwardly into the socket receptacle in spaced relation as shown in FIG. 5. The upper portions of the socket power contacts have opposed parallel planar surfaces which are engaged by the power contact assembly 14 of the plug as will be developed below. The socket further includes a central signal contact assembly 28 arranged between the power contact. The signal contact assembly is preferably centrally arranged within the socket housing and includes a spaced pair of contacts 28*a* arranged on opposite sides of the socket axis. The socket further includes additional seals 30 and fasteners 32** for connection with additional components or modules.

Figure 6:
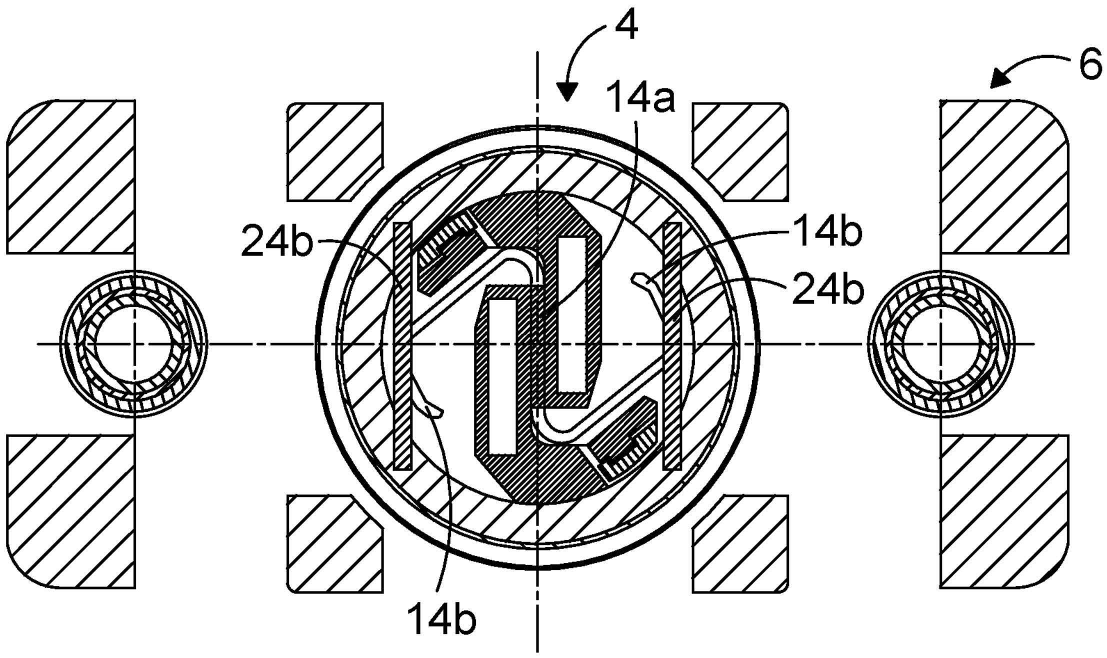
FIGS. 6 and 7 are top sectional views through an upper portion of the connector assembly taken along line 6-6 of FIG. 5 showing the power contacts of the plug and socket in the operable and inoperable positions, respectively.
Figure 7:
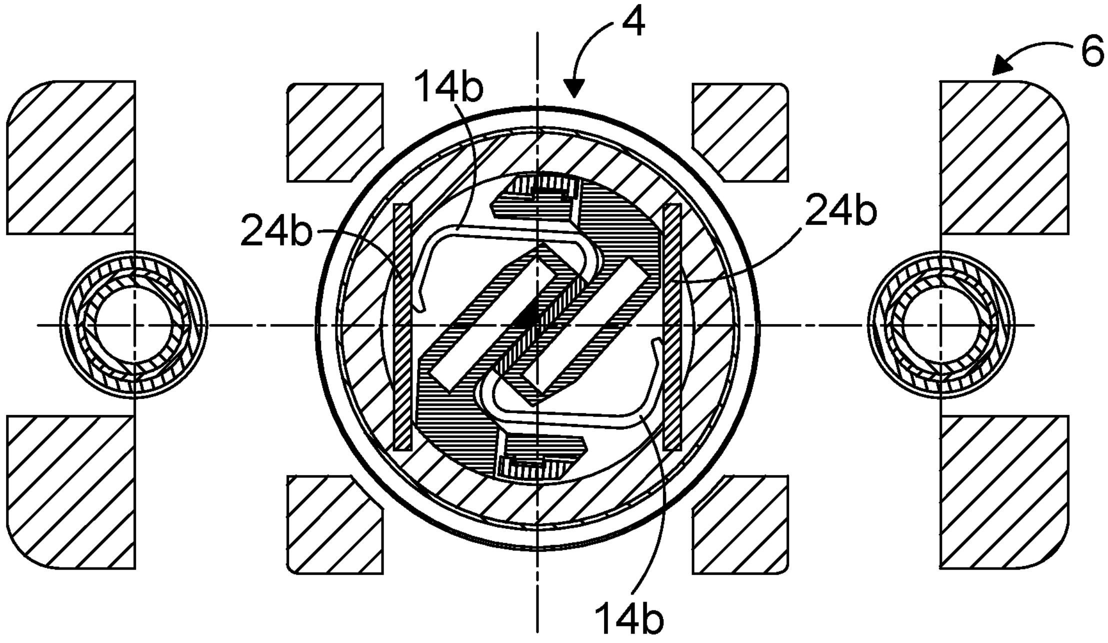
Figure 10:
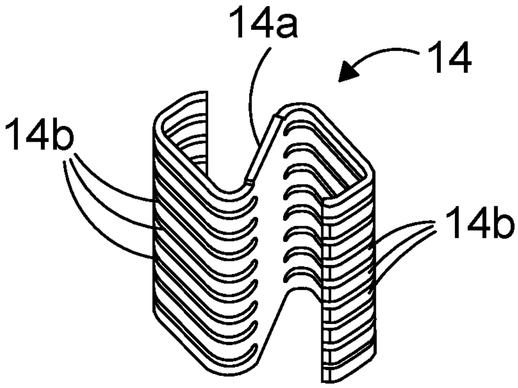
FIG. 10 is a perspective view of a first embodiment of the plug power contact assembly having an S-shaped cross-sectional configuration.
Figure 11:
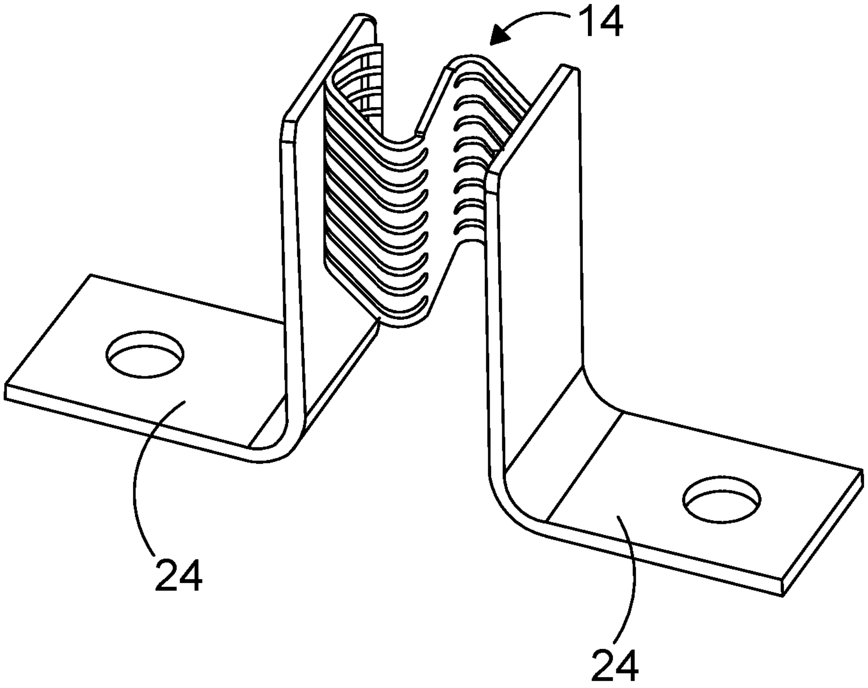
FIG. 11 is a perspective view of the plug power contact assembly of FIG. 10 arranged within the socket power contacts.

In a preferred embodiment, the plug power contact assembly 14 has a central portion **14*a* from which a plurality of opposed pairs of spaced parallel blade contacts 14*b* extend outwardly. The blade contacts are formed of a conductive material such as metal and preferably have a resilient spring-like nature. In one embodiment shown in FIGS. 10 and 11, the contact assembly has an S-shaped cross-sectional configuration. Such a blade assembly is also shown in FIGS. 6 and 7 which illustrate the plug in its operable and inoperable positions, respectively. More particularly, the plug housing includes an internal slot or channel within which the central portion 14*a* of the plug power contact assembly is retained. As shown in FIG. 6, in the operable position of the plug, a significant portion of each blade 14*a* of the plug power contact assembly engages a planar surface of the adjacent socket power contact portion 24*b*. In the inoperable position of the plug 4 shown in FIG. 7, a lesser portion of each blade 14*b*** of the plug power contact assembly engages a planar surface of the adjacent socket power contact. In either position, the blade power contacts of the plug are arranged within and biased against the socket power contacts owing to the spring force within the blades.

Figure 8:
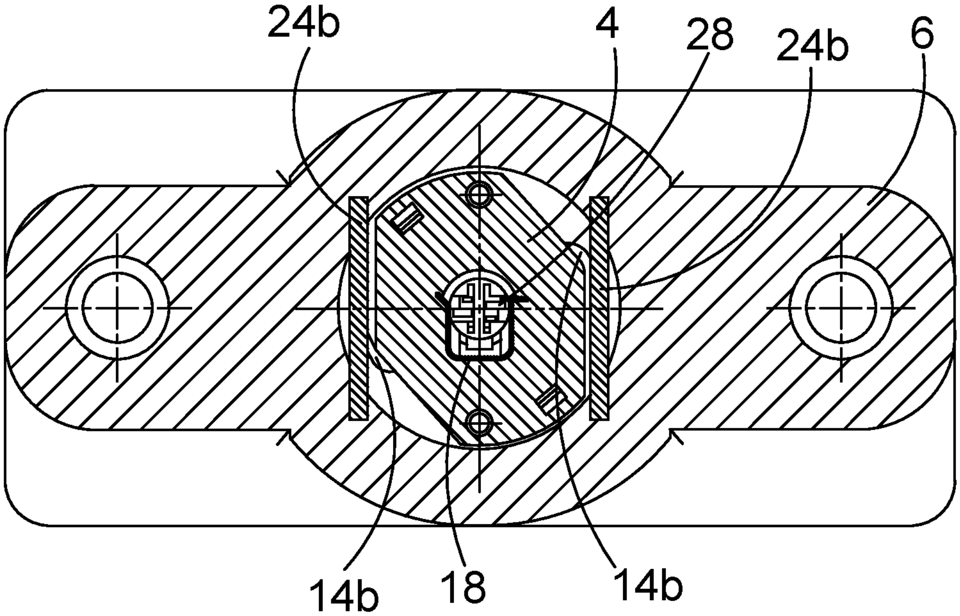
FIGS. 8 and 9 are top sectional view of a lower portion the connector assembly taken along line 8-8 of FIG. 5 showing the signal contacts of the plug and socket in the operable and inoperable positions, respectively.
Figure 9:
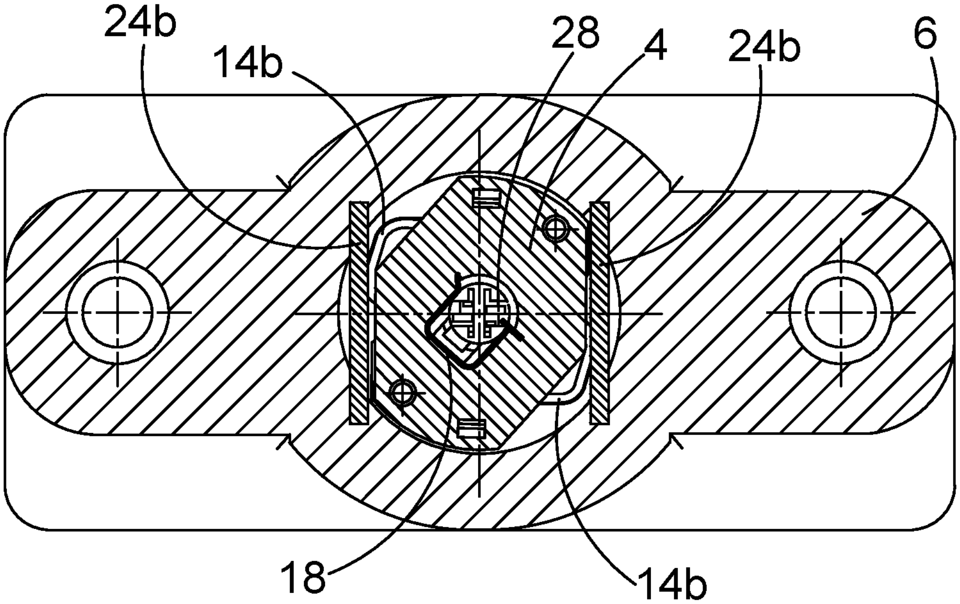

Referring now to FIGS. 8 and 9, the impact of the orientation of the plug 4 relative to the socket 6 at the signal contact interface will be described. In the operative position of the plug shown in FIG. 8, the signal bridge contact 18 of the plug engages the upper ends of the socket signal contacts **28*a* to provide an electrical connection therebetween. More particularly, the bridge signal contact 18 has a U-shaped cross-sectional configuration. The upper ends at opposite sides of the bridge contact the upper edges of the socket signal contacts. When the plug is rotated to the inoperable position shown in FIG. 9, the plug bridge signal contact is rotated out of engagement with the socket signal contacts 28*a*** to electrically and mechanically disconnect the plug and socket signal contacts. When the plug is in the operable position, signals transmitted between the plug and socket enable the power contacts between the plug and socket to transmit power or electrical current through the connector assembly. Accordingly, if the connector assembly is arranged between a power source such as a battery and an electrical component or module, the connector assembly supplies power from the source to the component when the plug is rotated to the operable position. However, when the plug is rotated to its inoperable position, the plug and signal contacts are disconnected. This prevents power transfer between the plug and signal power contacts, even if they remain at least partially connected. Accordingly, in the inoperable position, the connector assembly prevents "hot" plugging of the connection between the power contacts.

Figure 12:
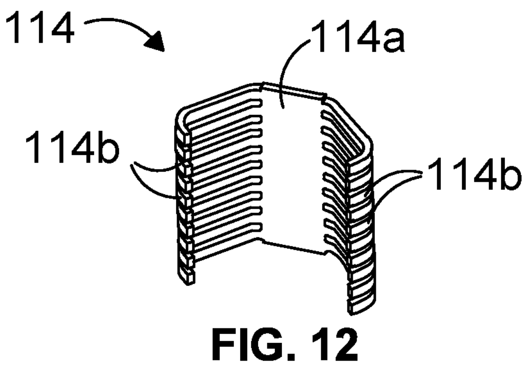
FIG. 12 is a perspective view of a second embodiment of the plug power contact assembly having a U-shaped cross-sectional configuration.
Figure 13:
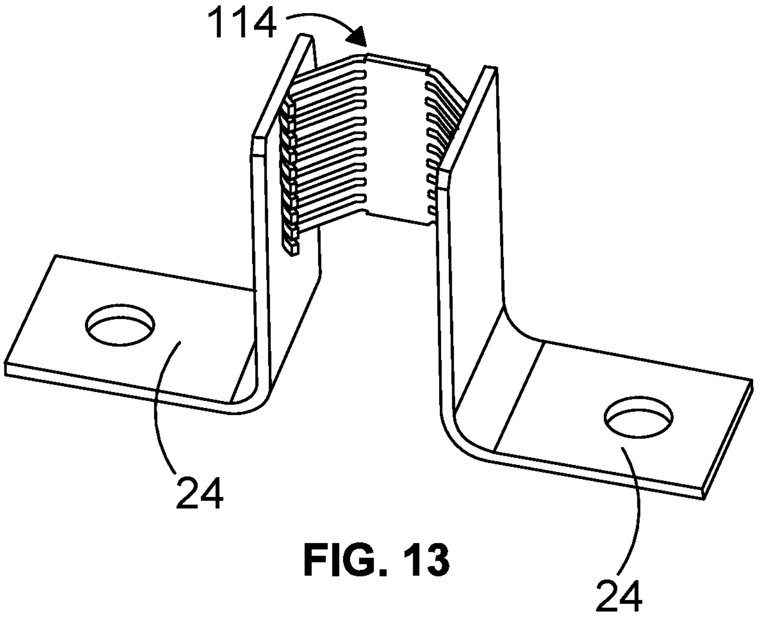
FIG. 13 is a perspective view of the plug power contact assembly of FIG. 12 arranged within the socket power contacts.
Figure 14:
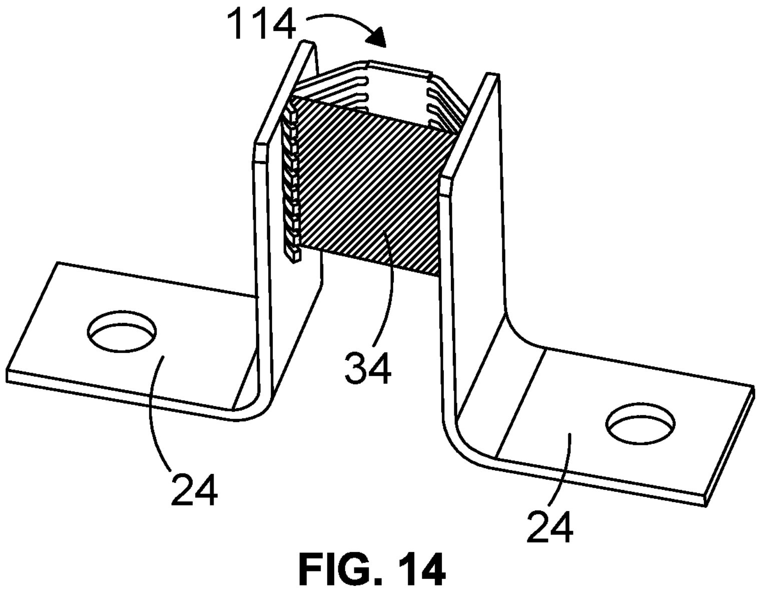
FIG. 14 is a perspective similar to FIG. 13 but including springs arranged between the opposed pairs of contacts of the plug power contact assembly.

Alternate configurations for the plug power contact assembly are shown in FIGS. 12-17. In FIGS. 12 and 13, the power contact assembly 114 has a U-shaped configuration including a central portion **114*a* from which a plurality of spaced parallel blade contacts 114*b* extend. The oppositely extending contacts abut against the planar surfaces of the opposed socket power contacts portions 24*b* as shown in FIG. 13. In all embodiments, the socket power contacts are preferably rigid while the plug power blade contacts have a resilient structure which can be deformed or compressed by rotation of the plug to the operable position and which return to a normal configuration by rotation of the plug to the inoperable position. The blade contacts slide along the planar surfaces of the socket power connectors during rotation of the plug. To assist with returning the contacts to their normal configuration, biasing springs 34 may be provided between the ends of opposed contacts 114*b* as shown in FIG. 14**.

Figure 15:
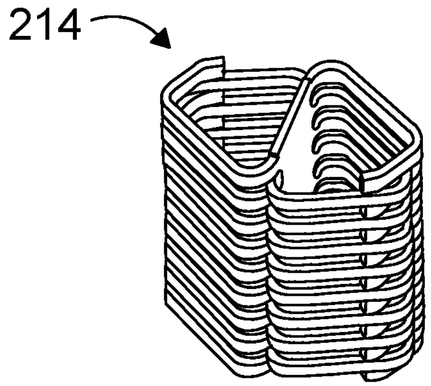
FIG. 15 is a perspective view of a third embodiment of the plug power contact assembly having an extended S-shaped cross-sectional configuration.
Figure 16:
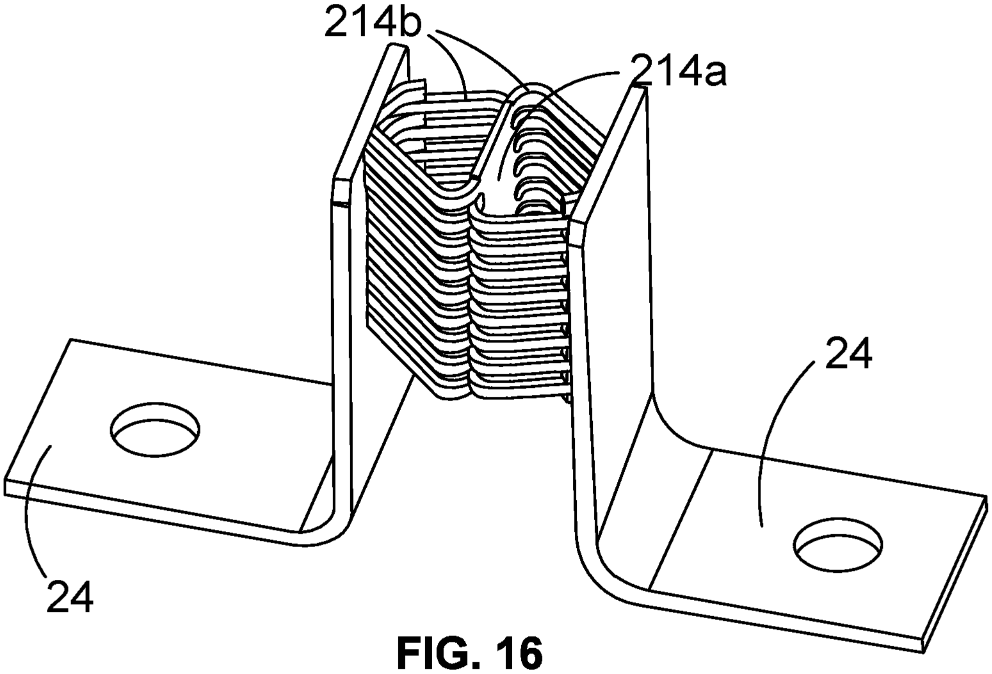
FIG. 16 is a perspective view of the plug power contact assembly of FIG. 15 arranged within the socket power contacts.
Figure 17:
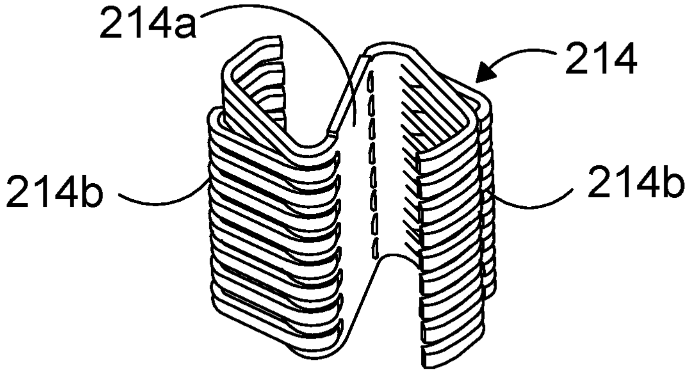
FIG. 17 is a perspective view of a further embodiment of the plug power contact assembly having an S-shaped cross-sectional configuration.

In FIGS. 15 and 16, a further configuration for the plug power contact assembly 214 is shown. It is similar to that of FIG. 10 except that the pairs of spaced parallel blade contacts **214*b* have alternating contacts which extend from the central portion 214*a* at first and second distances, the second distance extending to an opposite end of the central portion. In the configuration shown in FIG. 17, the blade contacts 314*b* of the plug power contact assembly 314 also alternate and extend at different distances, but no blade contacts extend to an opposite end of the central portion 314*a***.

Figure 18:
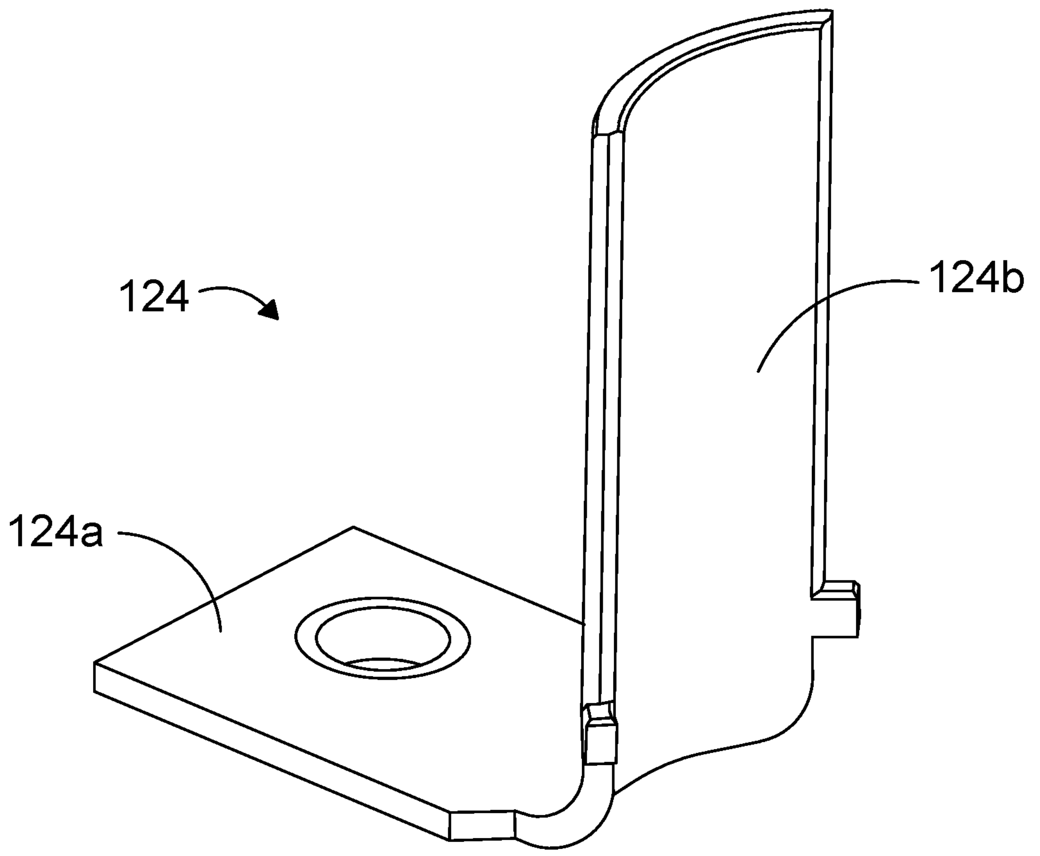
FIG. 18 is a perspective view of a socket power contact having a concave contact surface according to an alternate embodiment of the invention.

FIG. 18 shows an alternate configuration for a socket power contact 124. The contact has an L-shaped configuration including a first or base portion **124*a* containing an opening for receiving a fastener for connection with a socket housing and a second contact portion 124*b*. The contact portion 124***b* has a concave configuration to define a curved surface for contact by the plug blade contacts. The concave configuration enables the plug blade contacts to slide along the socket contact portion 124*b* during movement between the operable and inoperable positions.

It will be appreciated that the socket and rotary plug connector assembly is more durable than prior rotary plug connectors in that the socket power contacts are formed of a durable metal material which is not prone to damage through use as is the case with tulip power contacts. In addition, the blade contacts of the plug power contact assembly are also more durable than pin power contacts of the prior devices. The blade contacts of the plug are arranged within or between the socket power contacts. Thus, if damage to the blade contacts occurs, the plug may be easily removed and replaced with a new plug without having to replace the socket or the entire connector assembly.

While the preferred forms and embodiments of the invention have been illustrated and described, it will be apparent to those of ordinary skill in the art that various changes and modifications may be made without deviating from the inventive concepts set forth above.

What is claimed is:

1. A rotary electrical connector assembly, comprising:

(a) a socket including a receptacle containing a power contact assembly including (1) a pair of opposed power contacts configured as blade contacts arranged in said receptacle; and (2) a signal contact assembly arranged between and spaced from said pair of power contacts; and (b) a plug arranged within said socket receptacle and configured for rotary movement between operable and inoperable positions relative to said socket, said plug including (1) a power contact assembly including a plurality of resilient spaced blade contacts which are configured to engage said socket power contacts; and (2) a signal bridge contact configured to engage said socket signal contact assembly when said plug is in the operable position to deliver power between said plug and said socket power contacts and to disengage from said socket signal contact assembly when said plug is in the inoperable position to prevent delivery of power between said plug and said socket power contacts.

2. The rotary electrical connector assembly as defined in claim 1, wherein said pair of opposed power contacts have one of a planar and a concave contact surface.

3. The rotary electrical connector assembly as defined in claim 2, wherein said plug power contact assembly comprises a central portion and opposed pairs of spaced parallel blade contacts which extend outwardly from said central portion, each pair of spaced parallel blade contacts at least partially engaging said opposed socket power contacts when said plug is rotated between said operable and inoperable positions.

4. The rotary electrical connector assembly as defined in claim 3, wherein said plug spaced parallel blade contacts comprise spring contacts.

5. The rotary electrical connector assembly as defined in claim 3, wherein said plug spaced parallel blade contacts have an S-shaped cross-sectional configuration.

6. The rotary electrical connector assembly as defined in claim 3, wherein said pairs of spaced parallel blade contacts have alternating blade contacts which extend from said central portion at first and second distances, respectively.

7. The rotary electrical connector assembly as defined in claim 6, wherein said second distance extends to an opposite end of said central portion.

8. The rotary electrical connector assembly as defined in claim 3, wherein said plug spaced parallel blade contacts have a U-shaped cross-sectional configuration.

9. The rotary electrical connector assembly as defined in claim 8, and further comprising a plurality of springs arranged between opposed ends of said opposed pairs of spaced parallel blade contacts which bias said opposed pairs of spaced parallel blade contacts away from each other, respectively.

10. The rotary electrical connector assembly as defined in claim 2, wherein said socket signal contact assembly includes a pair of spaced parallel contacts.

11. The rotary electrical connector assembly as defined in claim 10, wherein said plug signal bridge contact is configured to engage free ends of said spaced parallel contacts of said socket signal contact assembly when the plug is in the operable position.

* * * * *